(12) United States Patent
Matsumoto

(10) Patent No.: US 11,553,804 B2
(45) Date of Patent: Jan. 17, 2023

(54) HORIZONTAL UNIVERSAL JOINT

(71) Applicant: Grandoir International Ltd., Nagakute (JP)

(72) Inventor: Junya Matsumoto, Nagakute (JP)

(73) Assignee: Grandoir International Ltd., Nagakute (JP)

( * ) Notice: Subject to any disclaimer, the term of this patent is extended or adjusted under 35 U.S.C. 154(b) by 1428 days.

(21) Appl. No.: 15/848,293

(22) Filed: Dec. 20, 2017

(65) Prior Publication Data
US 2018/0110344 A1    Apr. 26, 2018

Related U.S. Application Data

(63) Continuation of application No. PCT/JP2015/069285, filed on Jul. 3, 2015.

(51) Int. Cl.
*A47D 13/06* (2006.01)
*F16B 7/14* (2006.01)
(Continued)

(52) U.S. Cl.
CPC .......... *A47D 13/065* (2013.01); *A47D 13/06* (2013.01); *A47D 15/00* (2013.01); *F16B 7/04* (2013.01);
(Continued)

(58) Field of Classification Search
CPC .... A47D 13/06; A47D 13/061; A47D 13/065; E04H 17/185; F16B 12/40; F16B 7/04; F16B 7/14; F16B 7/18
See application file for complete search history.

(56) References Cited

U.S. PATENT DOCUMENTS 4,614,452 A * 9/1986 Wang .................. F16C 11/10
403/97
4,645,183 A * 2/1987 Rattray ............... A47D 13/063
256/25
(Continued)

FOREIGN PATENT DOCUMENTS

CN       101263309 A *  9/2008  ............... B62B 9/20
DE    20 2006 005 239 U1    7/2006
(Continued)

OTHER PUBLICATIONS

European Office Action (Application No. 15897653.0) dated Jun. 26, 2020.
(Continued)

*Primary Examiner* — Jonathan P Masinick
(74) *Attorney, Agent, or Firm* — Burr & Brown, PLLC

(57) ABSTRACT

A horizontal universal joint includes a first joint member and a second joint member. The first joint member is integrally formed by a frame insertion port and a female coupling port. The second joint member is integrally formed by a frame insertion port and a male coupling port. The female coupling port of the first joint member and the male coupling port of the second joint member are removably engaged via an elastic body. Teeth rows are formed at an inner peripheral surface of the female coupling port and an outer peripheral surface of the male coupling port meshing with one another. Depending on meshing positions of both teeth rows when the male coupling port is inserted into the female coupling port, the horizontal direction where the frame insertion port of the second joint member faces relative to the frame insertion port of the first joint member is changeable.

4 Claims, 6 Drawing Sheets

(51) Int. Cl.
    *F16B 7/04*             (2006.01)
    *F16B 7/18*             (2006.01)
    *A47D 15/00*          (2006.01)
    *F16B 12/40*          (2006.01)

(52) U.S. Cl.
    CPC .................. *F16B 7/14* (2013.01); *F16B 7/18* (2013.01); *F16B 12/40* (2013.01)

(56) References Cited

U.S. PATENT DOCUMENTS

| | | | | |
|---|---|---|---|---|
| 4,848,818 A | * | 7/1989 | Smith | E04D 13/0765 294/181 |
| 4,880,331 A | * | 11/1989 | Zun | F16B 21/04 403/97 |
| 4,929,113 A | * | 5/1990 | Sheu | F16C 11/045 403/324 |
| 5,039,118 A | * | 8/1991 | Huang | B62B 9/20 403/96 |
| 5,123,768 A | * | 6/1992 | Franklin | F16C 11/10 403/96 |
| 5,381,570 A | | 1/1995 | Cheng | |
| 5,520,474 A | * | 5/1996 | Liu | F16C 11/10 403/92 |
| 5,661,942 A | * | 9/1997 | Palmer | E04H 15/48 135/156 |
| 6,595,498 B1 | * | 7/2003 | Andersen | E06B 9/04 256/26 |
| 6,629,801 B2 | * | 10/2003 | Cheng | B62B 9/20 403/96 |
| 6,715,182 B2 | * | 4/2004 | Cheng | E05F 1/063 16/280 |
| 6,948,197 B1 | * | 9/2005 | Chen | F16C 11/10 5/655 |
| 7,552,513 B2 | * | 6/2009 | Cheng | E06B 9/04 16/334 |
| 7,591,604 B2 | * | 9/2009 | Roberts | B25F 5/02 403/324 |
| 7,721,622 B2 | * | 5/2010 | Wen | G05G 5/06 74/523 |
| 7,887,029 B2 | * | 2/2011 | Flannery | E06B 9/06 256/65.16 |
| 10,060,468 B2 | * | 8/2018 | Whitney | F16C 11/045 |
| 11,066,870 B1 | * | 7/2021 | Flannery | A01K 1/035 |
| 2007/0210293 A1 | * | 9/2007 | Cheng | E04H 17/18 256/26 |
| 2008/0213039 A1 | | 9/2008 | Chen et al. | |

FOREIGN PATENT DOCUMENTS

| | | |
|---|---|---|
| JP | S61-19116 U | 2/1986 |
| JP | H07-046196 Y2 | 10/1995 |
| JP | H08-189513 U | 7/1996 |
| JP | 2003-116679 A1 | 4/2003 |
| JP | 3122547 U | 6/2006 |
| JP | 2013-154082 A1 | 8/2013 |

OTHER PUBLICATIONS

International Search Report and Written Opinion (Application No. PCT/JP2015/069285) dated Aug. 4, 2015.
Extended European Search Report (Application No. 15897653.0) dated Jan. 25, 2019.

* cited by examiner

HORIZONTAL UNIVERSAL JOINT

BACKGROUND OF INVENTION

This application is a Continuation of International Application No. PCT/JP2015/069285, filed on Jul. 3, 2015, the disclosure of which is incorporated by reference herein in its entirety.

TECHNICAL FIELD

The disclosure relates to a horizontal universal joint and, in further detail, relates to an improvement in the horizontal universal joint that can freely change a coupling angle of two joint members in a horizontal direction.

BACKGROUND ART

For example, an enclosure for baby and infant, which is used surrounding play equipment, beddings, and similar goods for baby and infant, is used by coupling units where a plurality of vertical frames are mounted at predetermined intervals between upper and lower two horizontal frames into a circular shape as a whole. With such enclosure for baby and infant, to couple another one unit to the one unit, end portions of the upper and lower horizontal frames are coupled between both units via joints. As such joints, in addition to joints whose coupling angle in a horizontal direction is fixed, for example, joints like nipples that linearly couple both and joints like elbows that couple both at a constant angle, and joints whose coupling angle in a horizontal direction can be freely changed is used.

Conventionally, as a joint whose coupling angle in a horizontal direction can be freely changed, the following has been known. A collar is fixedly secured to a vertical rod body, and one coupling pipe is mounted to this collar. A rotating pipe is rotatably mounted to the vertical rod body, and the other coupling pipe is mounted to this rotating pipe. Frame end portions of an enclosure are inserted into these coupling pipes (for example, see Japanese Laid-Open Patent Publication No. 2003-116679). Additionally, for example, the following has been known. Two female ports are disposed at an end portion in an axial direction of a vertical rod, and one end portions of male ports are inserted into the respective female ports. Frame end portions of an enclosure are inserted into the other end portions of the respective male ports (for example, see Japanese Laid-Open Patent Publication No. 2013-154082).

However, the conventional horizontal universal joints as described above have insufficient strength in terms of the structure. The horizontal universal joints actually have a problem of poor usability.

SUMMARY

The disclosure solves the problem by providing a horizontal universal joint that has a simple structure and sufficient strength and actually features good usability.

The disclosure to solve the problem is a horizontal universal joint that includes a first joint member and a second joint member. The first joint member is integrally formed by a frame insertion port facing a horizontal direction and a female coupling port facing a vertical direction. The second joint member is integrally formed by a frame insertion port facing the horizontal direction and a male coupling port facing the vertical direction. The female coupling port of the first joint member and the male coupling port of the second joint member are removably engaged via an elastic body. Teeth rows are formed at an inner peripheral surface of the female coupling port and an outer peripheral surface of the male coupling port meshing with one another. Depending on meshing positions of both teeth rows when the male coupling port is inserted into the female coupling port, the horizontal direction where the frame insertion port of the second joint member faces relative to the frame insertion port of the first joint member is changeable.

The horizontal universal joint according to the disclosure (hereinafter referred to as a joint of the disclosure) includes the first joint member, which is integrally formed by the frame insertion port facing the horizontal direction and the female coupling port facing the vertical direction, and the second joint member integrally formed by the frame insertion port facing the horizontal direction and the male coupling port facing the vertical direction. An axial direction of the frame insertion port of the first joint member and an axial direction of the female coupling port are in a relationship perpendicular to one another. Similarly, an axial direction of the frame insertion port of the second joint member and an axial direction of the male coupling port are in a relationship perpendicular to one another. End portions of upper frames and end portions of lower frames of the above-described enclosure are inserted into the frame insertion ports of the first joint member and the second joint member facing the horizontal direction.

With the joint of the disclosure, the female coupling port of the first joint member and the male coupling port of the second joint member are removably engaged via the elastic body. The elastic body is, for example, a rubber and a spring with restoring force. For example, the spring is disposed between the female coupling port of the first joint member and the male coupling port of the second joint member. A bolt is passed from the male coupling port to the female coupling port in an axial direction of the spring. A distal end portion of the bolt is screwed with and fastened to a screw groove, which is disposed at a bottom of the female coupling port. Thus, the female coupling port of the first joint member and the male coupling port of the second joint member can be removably engaged.

With the joint of the disclosure, teeth rows are formed at the inner peripheral surface of the female coupling port of the first joint member and the outer peripheral surface of the male coupling port of the second joint member meshing with one another. Depending on the meshing positions of both teeth rows when the male coupling port is inserted into the female coupling port, the horizontal direction where the frame insertion port of the second joint member faces relative to the frame insertion port of the first joint member is changeable. The female coupling port is formed into a cylindrical shape, and the teeth row along the axial direction is formed on the inner peripheral surface of the female coupling port. Similarly, the male coupling port is formed into a cylindrical shape with a diameter slightly smaller than the female coupling port, and the teeth row along the axial direction is formed on the outer peripheral surface of the male coupling port. When the male coupling port is inserted into the female coupling port and the teeth rows of both are meshed, the horizontal direction where the frame insertion port of the second joint member faces relative to the frame insertion port of the first joint member is changeable depending on the meshing positions of both at the time.

The joint of the disclosure is preferably configured as follows. The first joint member further includes an auxiliary frame insertion port integrally formed opposed to the female coupling port. An auxiliary frame coupling pipe is removably engaged with the auxiliary frame insertion port. For example, the cylindrical auxiliary frame insertion port is integrally formed coaxially opposed to the female coupling port of the first joint member. The cylindrical auxiliary frame coupling pipe with a diameter slightly smaller than the auxiliary frame insertion port is inserted into the auxiliary frame insertion port. At this time, a V-shaped leaf spring is pushed into the auxiliary frame coupling pipe, and hemispherical protrusions formed on both end portions are projected from small holes disposed on the auxiliary frame coupling pipe. The protrusions are fitted to small holes, which are disposed on an inner peripheral surface of the auxiliary frame insertion port. Thus, the auxiliary frame coupling pipe can be removably engaged with the auxiliary frame insertion port.

Although any material is available as a material of the joint of the disclosure, such as a wood, a metal, a ceramic, a plastic, and a composite material, in terms of economic efficiency, lightweightness, durability, usability, and a similar factor, the first joint member and the second joint member are preferably made of the plastic.

Although the application of the joint of the disclosure is not especially limited, the joint is especially effective in the case of coupling mutual frames of an enclosure to surround play equipment, beddings, and similar goods for baby and infant for safety. Such enclosure for baby and infant is used by coupling units where a plurality of vertical frames are mounted at predetermined intervals between upper and lower two horizontal frames into a circular shape as a whole. The joint of the disclosure is effective when the upper horizontal frames are mutually coupled and the lower horizontal frames are mutually coupled between both units. Especially, as described above, the enclosure for baby and infant that includes the auxiliary frame insertion ports and the auxiliary frame coupling pipes can support an auxiliary frame functioning as a vertical frame between the upper and the lower auxiliary frame coupling pipes. Accordingly, excessive gaps between the mutual vertical frames at parts of the joints of coupling the mutual horizontal frames at the top and the bottom can be prevented.

As described above, a joint of the disclosure has a simple structure and sufficient strength and provides an effect of good usability actually.

EMBODIMENTS

Figure 1:
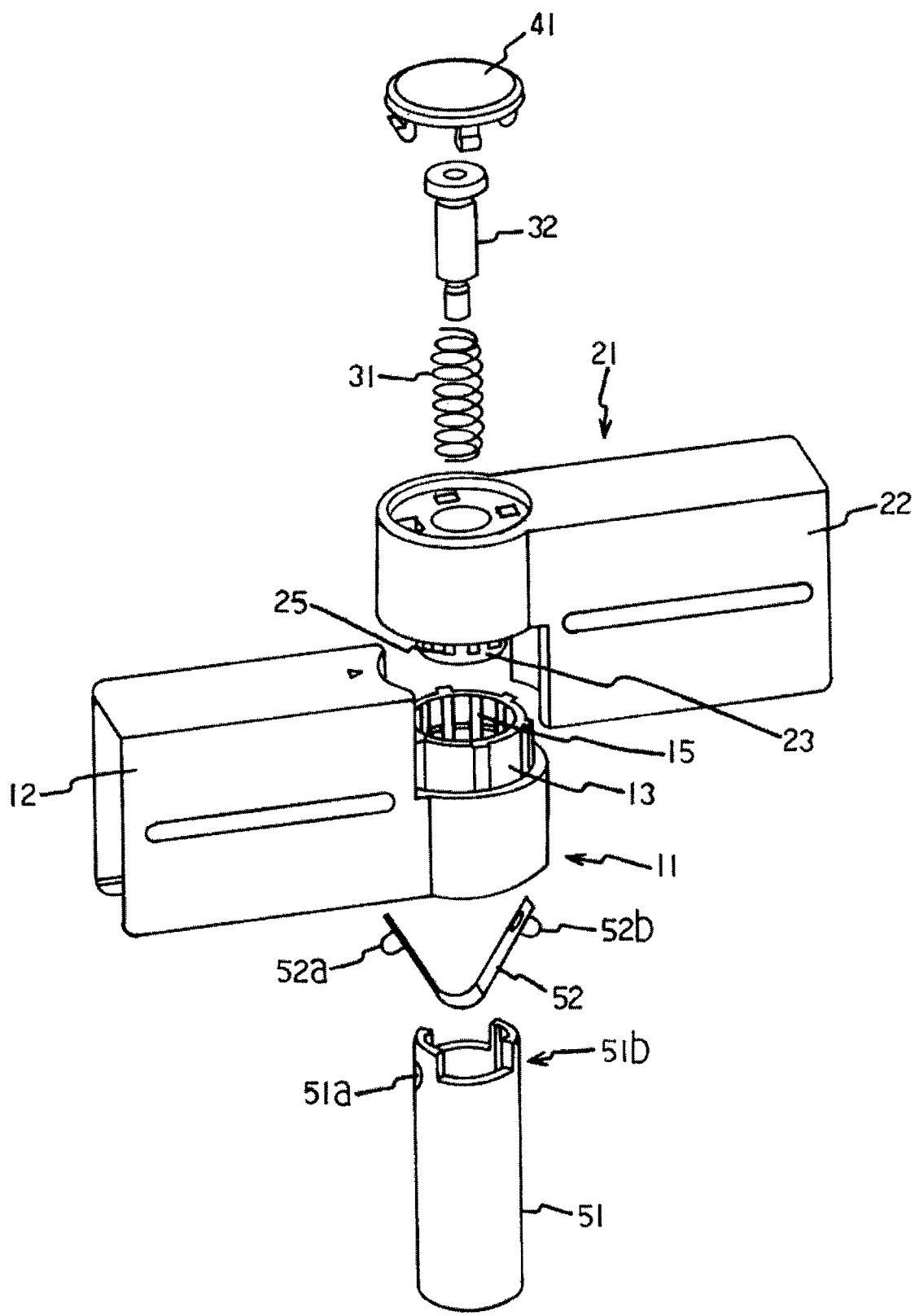
FIG. 1 is an exploded view illustrating an example of a joint of the disclosure before assembly.
Figure 2:
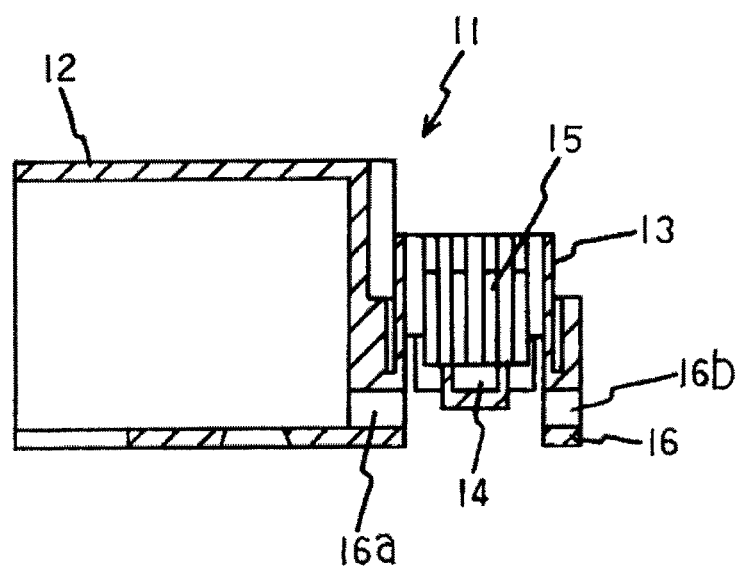
FIG. 2 is a vertical cross-sectional view illustrating a first joint member in FIG. 1.
Figure 3:
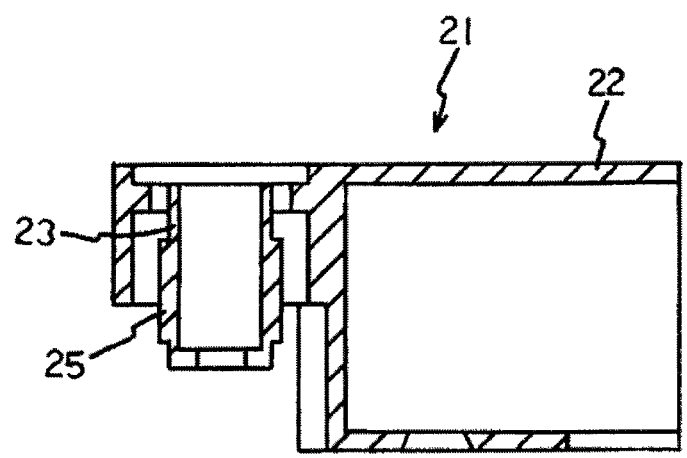
FIG. 3 is a vertical cross-sectional view illustrating a second joint member in FIG. 1.
Figure 4:
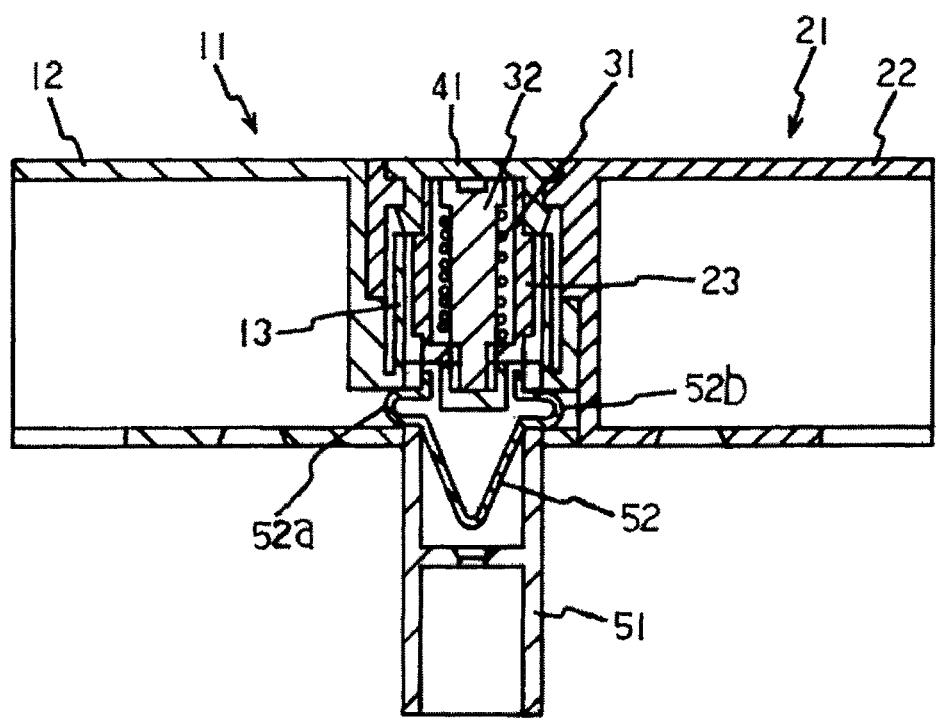
FIG. 4 is a vertical cross-sectional view illustrating the joint of the disclosure identical to FIG. 1 after the assembly.

A joint of the embodiment illustrated in FIG. 1 to FIG. 4 includes a first joint member 11, which is integrally formed by a frame insertion port 12 facing a horizontal direction with a female coupling port 13 facing a vertical direction, and a second joint member 21 integrally formed by a frame insertion port 22 facing the horizontal direction with a male coupling port 23 facing the vertical direction. An axial direction of the frame insertion port 12 of the first joint member 11 and an axial direction of the female coupling port 13 are in a relationship perpendicular to one another. Similarly, an axial direction of the frame insertion port 22 of the second joint member 21 and an axial direction of the male coupling port 23 are in a relationship perpendicular to one another. End portions of upper frames and end portions of lower frames of the above-described enclosure are inserted into the frame insertion ports 12 and 22 of the first joint member 11 and the second joint member 21 facing the horizontal direction.

The female coupling port 13 of the first joint member 11 and the male coupling port 23 of the second joint member 21 are removably engaged via a spring 31. The spring 31 is disposed between the female coupling port 13 of the first joint member 11 and the male coupling port 23 of the second joint member 21. A bolt 32 is passed from the male coupling port 23 to the female coupling port 13 in an axial direction of the spring 31. A distal end portion of the bolt 32 is screwed with and fastened to a screw groove 14, which is disposed at a bottom of the female coupling port 13. Thus, the female coupling port 13 of the first joint member 11 and the male coupling port 23 of the second joint member 21 are removably engaged via the spring 31.

Teeth rows 15 and 25 are formed at an inner peripheral surface of the female coupling port 13 of the first joint member 11 and an outer peripheral surface of the male coupling port 23 of the second joint member 21 meshing with one another. Depending on meshing positions of both when the male coupling port 23 is inserted into the female coupling port 13, the horizontal direction where the frame insertion port 22 of the second joint member 21 faces relative to the frame insertion port 12 of the first joint member 11 is changeable. The female coupling port 13 is formed into a cylindrical shape, and the teeth row 15 along the axial direction is formed on the inner peripheral surface of the female coupling port 13. Similarly, the male coupling port 23 is formed into a cylindrical shape with a diameter slightly smaller than the female coupling port 13, and the teeth row 25 along the axial direction is formed on the outer peripheral surface of the male coupling port 23. When the male coupling port 23 is inserted into the female coupling port 13 and the teeth rows 15, 25 of both are meshed, the horizontal direction where the frame insertion port 22 of the second joint member 21 faces relative to the frame insertion port 12 of the first joint member 11 is changeable depending on the meshing positions of both.

With the joint of the embodiment illustrated in the drawings, the first joint member 11 further includes an auxiliary frame insertion port 16 integrally formed opposed to the female coupling port 13. An auxiliary frame coupling pipe 51 is removably engaged with the auxiliary frame insertion port. The cylindrical auxiliary frame insertion port 16 is integrally formed coaxially opposed to the female coupling port 13 of the first joint member 11. The cylindrical auxiliary frame coupling pipe 51 with a diameter slightly smaller than the auxiliary frame insertion port 16 is inserted into the auxiliary frame insertion port 16. At this time, a V-shaped leaf spring 52 is pushed into the auxiliary frame coupling pipe 51, and hemispherical protrusions 52a and 52b formed on both end portions are projected from small holes 51a and 51b disposed on the auxiliary frame coupling pipe 51. The protrusions 52a and 52b are fitted to small holes 16a and 16b, which are disposed on an inner peripheral surface of the auxiliary frame insertion port 16. Thus, the auxiliary frame coupling pipe 51 can be removably engaged with the auxiliary frame insertion port 16. A cap 41 is covered on a surface opposed to the male coupling port 23 of the second joint member 21 to cover the spring 31 and the bolt 32.

Figure 5:
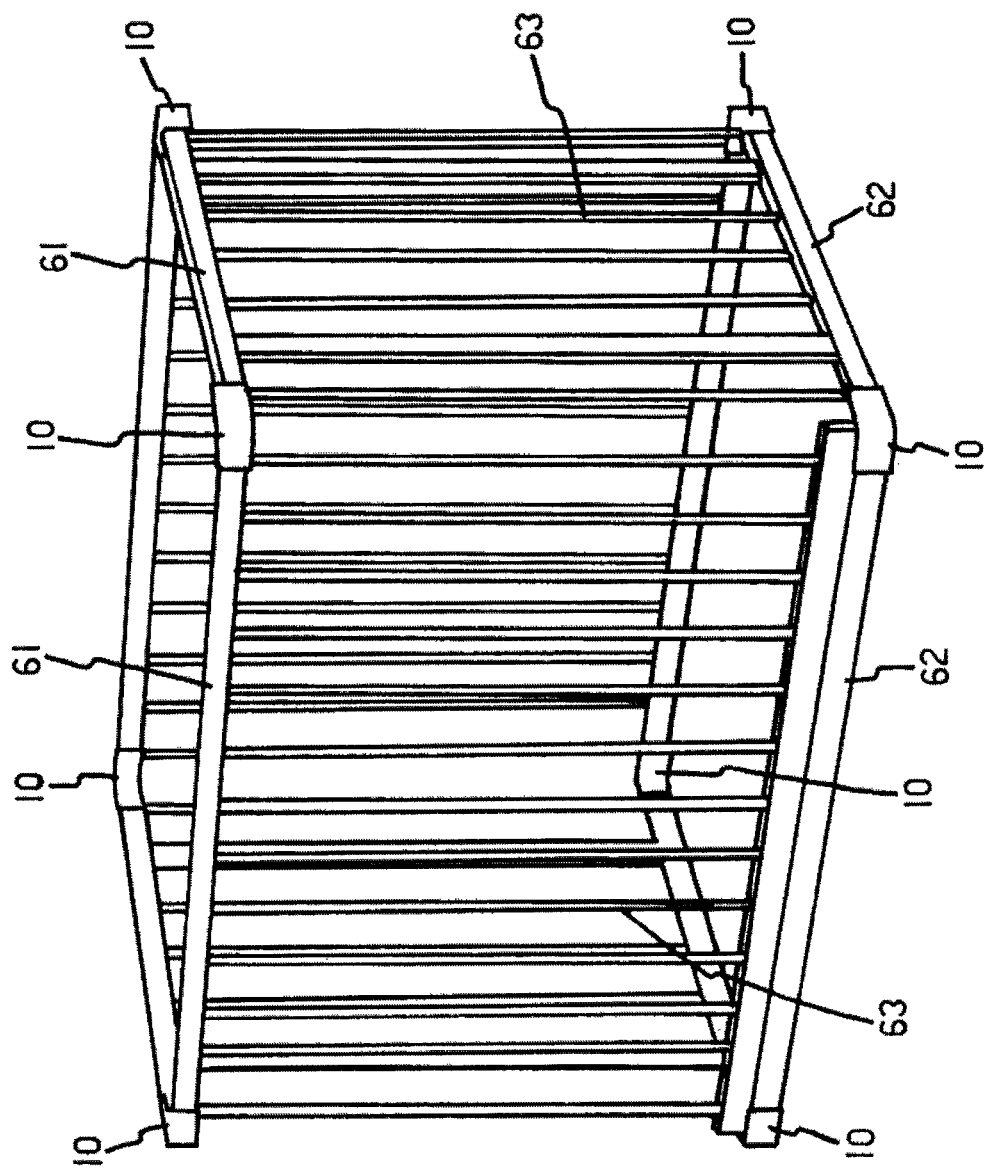
FIG. 5 is a perspective view illustrating an example of a use state of the joint of the disclosure.

In FIG. 5, the units are structured by mounting a plurality of vertical frames 63 . . . at predetermined intervals between upper horizontal frames 61 . . . and lower horizontal frames 62 . . . . The units are mutually coupled with joints 10 . . . of the embodiment, thus assembling the enclosure for baby and infant having a rectangular shape on the plane as a whole. Specifically, on the upper side of the enclosure for baby and infant, the horizontal frames 61 and 61 on the upper side of the units adjacent to the frame insertion ports 12 of the first joint members 11 and the frame insertion ports 22 of the second joint members 21 are inserted. The similar work is performed on the lower side of the enclosure for baby and infant as well, thus coupling both units to form almost right angle.

Figure 6:
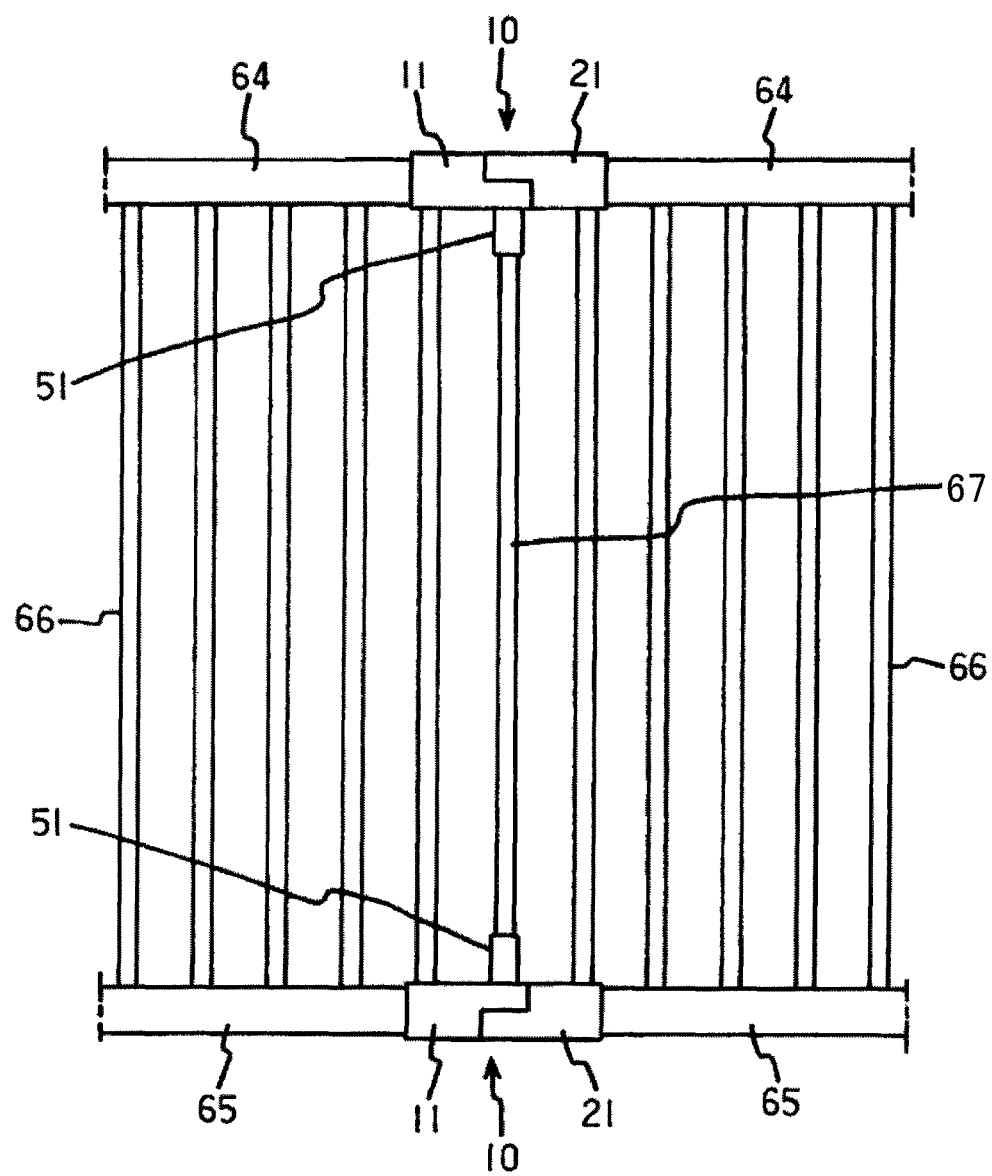
FIG. 6 is a partial front view illustrating another example of the use state of the joint of the disclosure.

In FIG. 6, the units are structured by mounting a plurality of vertical frames 66 . . . at predetermined intervals between upper horizontal frames 64 and 64 and lower horizontal frames 65 and 65. The units are mutually linearly coupled with the joints 10 . . . of the embodiment, thus assembling a part of the enclosure for baby and infant whose entire illustration is omitted. Specifically, on the upper side of the enclosure for baby and infant, the horizontal frames 64 and 64 on the upper side of the units adjacent to the frame insertion ports 12 of the first joint members 11 and the frame insertion ports 22 of the second joint members 21 are inserted. The similar work is performed on the lower side of the enclosure for baby and infant as well, thus linearly coupling both units. Here, as the joints 10 on the upper side and the lower side, one in which the auxiliary frame insertion port 16 is integrally formed with the first joint member 11 and the auxiliary frame coupling pipe 51 is engaged with the auxiliary frame insertion port 16 is used. An auxiliary frame 67 is bridged across the auxiliary frame coupling pipes 51 and 51 on both the upper side and the lower side. Excessive gaps between the mutual vertical frames 66 and 66 at parts of the joints 10 and 10 are prevented.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A horizontal universal joint comprising:
   a first joint member integrally formed by a frame insertion port and a female coupling port, the frame insertion port facing a horizontal direction, the female coupling port facing a vertical direction; and
   a second joint member integrally formed by a frame insertion port and a male coupling port, the frame insertion facing the horizontal direction, the male coupling port facing the vertical direction,
   wherein the female coupling port of the first joint member and the male coupling port of the second joint member are removably engaged via an elastic body,
   wherein teeth rows are formed at an inner peripheral surface of the female coupling port and an outer peripheral surface of the male coupling port meshing with one another,
   wherein depending on meshing positions of both teeth rows when the male coupling port is inserted into the female coupling port, the horizontal direction where the frame insertion port of the second joint member faces relative to the frame insertion port of the first joint member is changeable,
   where the first joint member further includes an auxiliary frame insertion port integrally formed opposed to the female coupling port,
   wherein an auxiliary frame coupling pipe is removably engaged with the auxiliary frame insertion port, and
   wherein projecting parts on respective ends of a V-shaped leaf spring are fit into and extend from respective holes on the auxiliary frame coupling pipe to engage respective holes on an inner peripheral surface of the auxiliary frame insertion port.

2. The horizontal universal joint according to claim 1, wherein the elastic body is a spring, the female coupling port of the first joint member being engaged with the male coupling port of the second joint member with the spring and a screw, the screw being passed through the spring in an axial direction.

3. The horizontal universal joint according to claim 1, wherein the first joint member and the second joint member are made of plastic.

4. The horizontal universal joint according to claim 1, wherein the horizontal universal joint is for coupling mutual frames of an enclosure for baby and infant.

* * * * *